(12) United States Patent
Ohashi et al.

(10) Patent No.: US 9,139,119 B2
(45) Date of Patent: Sep. 22, 2015

(54) WARMER EQUIPMENT AND WARMER DEVICE FOR VEHICLE SEAT

(75) Inventors: Tadahiko Ohashi, Hamamatsu (JP); Yasuhiro Ohashi, Hamamatsu (JP)

(73) Assignee: KURABE INDUSTRIAL CO., LTD., Hamamatsu-Shi, Shizuoka (JP)

( * ) Notice: Subject to any disclaimer, the term of this patent is extended or adjusted under 35 U.S.C. 154(b) by 2147 days.

(21) Appl. No.: 12/224,809

(22) PCT Filed: Mar. 6, 2007

(86) PCT No.: PCT/JP2007/054312
§ 371 (c)(1),
(2), (4) Date: Sep. 5, 2008

(87) PCT Pub. No.: WO2007/102500
PCT Pub. Date: Sep. 13, 2007

(65) Prior Publication Data
US 2009/0032518 A1    Feb. 5, 2009

(30) Foreign Application Priority Data
Mar. 7, 2006    (JP) ................. 2006-061616

(51) Int. Cl.
*B60L 1/02* (2006.01)
*H05B 1/00* (2006.01)
*B60N 2/56* (2006.01)

(52) U.S. Cl.
CPC ............. *B60N 2/5685* (2013.01); *B60N 2/56* (2013.01); *H05B 2203/029* (2013.01)

(58) Field of Classification Search
CPC ....... B60N 2/5685; B60N 2/56; B60N 2/5678; H05B 3/34–3/38; H05B 2203/029
USPC ......... 219/202, 212, 528, 543–549, 490, 494, 219/497, 504, 505
See application file for complete search history.

(56) References Cited

U.S. PATENT DOCUMENTS 4,700,046 A * 10/1987 Fristedt ................... 219/202
5,283,854 A *  2/1994 Schiebelhuth ........... 392/467
6,252,208 B1 *  6/2001 Topp ....................... 219/497

FOREIGN PATENT DOCUMENTS

| JP | S61-206408 | 9/1986 |
| JP | S63-203114 | 8/1988 |
| JP | 2003-109721 | 4/2003 |

* cited by examiner

*Primary Examiner* — Sang Y Paik
(74) *Attorney, Agent, or Firm* — Manabu Kanesaka

(57) ABSTRACT

Provided are a warmer equipment which is excellent in quick warming property at a rising time and which can satisfy temperature stability later thereby to improve the comfortableness, and a warmer device for a vehicle seat. The warmer equipment includes a warming member having a heater element, a temperature controlling thermostat, a temperature detecting element for detecting the temperature of the warming member, and a temperature control circuit for controlling the temperature of the warming member with an output coming from the temperature detecting element. The temperature controlling thermostat and the temperature control circuit are connected in parallel.

9 Claims, 4 Drawing Sheets

WARMER EQUIPMENT AND WARMER DEVICE FOR VEHICLE SEAT

FIELD OF THE INVENTION

The present invention relates to a warmer equipment for warming up, and a warmer device for a vehicle seat wherein the warmer equipment is employed. Especially, the present invention relates to the equipment and device which have an excellent quick warming-up-ability at a rising time and which can subsequently satisfy temperature stability and enhance comfortability.

BACKGROUND OF THE ART

Conventionally, as a warmer device for a vehicle seat, a temperature control system has generally been used so as to maintain a warming member formed of a cord-like heater and the like at a constant temperature by a thermostat. However, in this kind of temperature control system operated by a thermostat, the temperature of the warming member is determined by an operating temperature of the thermostat which is being used. Therefore, in order to satisfy a demand for freely setting the temperature of the warmer device for the vehicle seat and improving the comfortability, the number of parts has to be increased or a complicated circuit configuration has to be used by employing a method using a plurality of thermostats with different operating temperatures, or a method switching a heating value of an auxiliary heater which operates the thermostat, so that the realization was difficult in practice.

In order to satisfy the above-mentioned demands, for example, the warmer device for the vehicle seat as shown in FIGS. 7, 8 are known. In FIGS. 7, 8, a temperature control circuit 101 is connected in series to a warming member 104 wherein a cord-like heater 103 is meanderingly provided in a base material 102. The temperature control circuit 101 is connected to the warming member 104 outside the base material 102, and near the cord-like heater 103, a temperature detecting element 105 such as a thermistor and the like is arranged. By controlling a current control device such as a power MOS FET and the like embedded in the temperature control circuit 101 by a temperature signal from the temperature detecting element 105, the temperature of the warming member 104 is controlled. This kind of structure is disclosed in, for example, the conventional technology of Japanese Patent Publication 1.

Also, as a publication wherein the technology which conducts the temperature control using the temperature detecting element such as the thermistor and the like is disclosed, many publications are known in addition to the above-mentioned Japanese Patent Publication 1. For example, Japanese Patent Publication 2 and the like are disclosed.

Japanese Patent Publication 1: Unexamined Patent Application Publication No. 2003-217796
Japanese Patent Publication 2: Japanese Patent Publication (Tokuhyo) No. 2004-504082

DISCLOSURE OF INVENTION

Problems to be Resolved by the Invention

However, in the case of a temperature control circuit 101 which conducts a temperature control using a conventional temperature detecting element 105 such as the above-mentioned thermistor and the like, there are the following drawbacks. When the warming member 104, wherein the temperature detecting element 105 is placed, is assembled to the inside of a surface skin of a vehicle seat, and electricity is turned on from a state of a low temperature, the temperature of the cord-like heater 103 and the temperature signal of the temperature detecting element 105 rise at the approximately same speed. After that, when the temperature signal of the temperature detecting element 105 reaches a preset temperature, the electricity of the cord-like heater 103 is halted. However, it takes a long time for the temperature of the cord-like heater 103 to conduct heat to the outer surface, so that at the halting of the electricity of the cord-like heater 103, the temperature on the surface of the surface skin has not yet reached the preset temperature. In this state, the electricity of the cord-like heater 103 is halted and the temperature of the cord-like heater 103 decreases, so that the temperature of the outer surface decreases until the cord-like heater 103 is turned on by the electricity again although the temperature of the outer surface has not reached the preset temperature. Here, since the heat capacity of the vehicle seat itself is large, decrease of the temperature of the surface of the surface skin is slow compared to the decrease of the temperature of the cord-like heater 103. Thus, by repeatedly turning on and halting the electricity to the cord-like heater 103, the temperature of the outer surface gradually increases. Due to these operations, eventually, the temperature of the outer surface approximately reaches temperature close to the preset temperature of the cord-like heater 103, and is stabilized. However, by then, since the cord-like heater 103 is repeatedly turned on and halted, it would be a waste of time. Especially, in the case of the warming an object such as the vehicle seat and the like, it is not comfortable if the temperature of the outer surface does not reach the preset temperature within a short time. Thus, the aspect requiring an unnecessary time until reaching the above-mentioned preset temperature was a big problem in order to use the temperature control circuit 101 which conducts the temperature control using the temperature detecting element 105 such as the thermistor and the like.

As a method for improving the above-mentioned problem, a method of embedding a timer in the temperature control circuit 101, and forcibly turning on the electricity to the cord-like heater 103 for a certain period of time after being powered on, is conceivable. However, this kind of method creates the following new problems. Since repetitive on-off operations of the timer cause continuous current, the temperature can reach an abnormal temperature. Also, in order to avoid the above-mentioned problem, a circuit can become complicated, so that the cost would increase.

The present invention has been made in order to solve the above-mentioned conventional problems, and an object of the invention is to provide a warmer device for a vehicle seat with an excellent quick warming-up-ability at a rising time, and also abilities to subsequently satisfy temperature stability and easily enhance comfortability.

Means for Solving the Problems

In order to achieve the above-mentioned object, a warmer equipment according to claim 1 of the present invention comprises a warming member including a heater element; a temperature control thermostat; a temperature detecting element for detecting the temperature of the warming member; and a temperature control circuit for controlling the temperature of the warming member based on the output from the temperature detecting element. The temperature control thermostat and the temperature control circuit are connected in parallel.

Also, as for the warmer equipment according to claim 2, in the warmer equipment according to claim 1, an on-off operation range of the temperature detecting element is set between an on-off operation range of the temperature control thermostat.

Also, regarding the warmer equipment according to claim 3, in the warmer equipment according to claim 1, the warming member comprises a base material and the heater element comprising a cord-like heater arranged in the base material. The temperature control thermostat, the temperature detecting element and the temperature control circuit are all arranged in a predetermined position of the base material.

Also, regarding the warmer equipment according to claim 4, in the warmer equipment according to claim 3, the temperature control circuit is insulated and covered as well as a portion of a lead wire connected to the temperature control circuit.

Also, regarding the warmer equipment according to claim 5, in the warmer equipment according to claim 3, the lead wire of the temperature detecting element is connected to the temperature control circuit on the base material.

Also, regarding the warmer equipment according to claim 6, in the warmer equipment according to claim 4 or 5, the temperature control circuit has a thickness of 9 mm and below.

Also, in a warmer device for a vehicle seat according to claim 7, the warmer equipment according to any one of claims 1 to 6, is used.

Effect of the Invention

According to the invention, a warmer equipment for a vehicle seat which has an excellent quick warming-up-ability at a rising time and subsequently satisfies temperature stability and easily enhances the comfortability can be obtained.

EXPLANATION OF SYMBOLS

Figure 1:
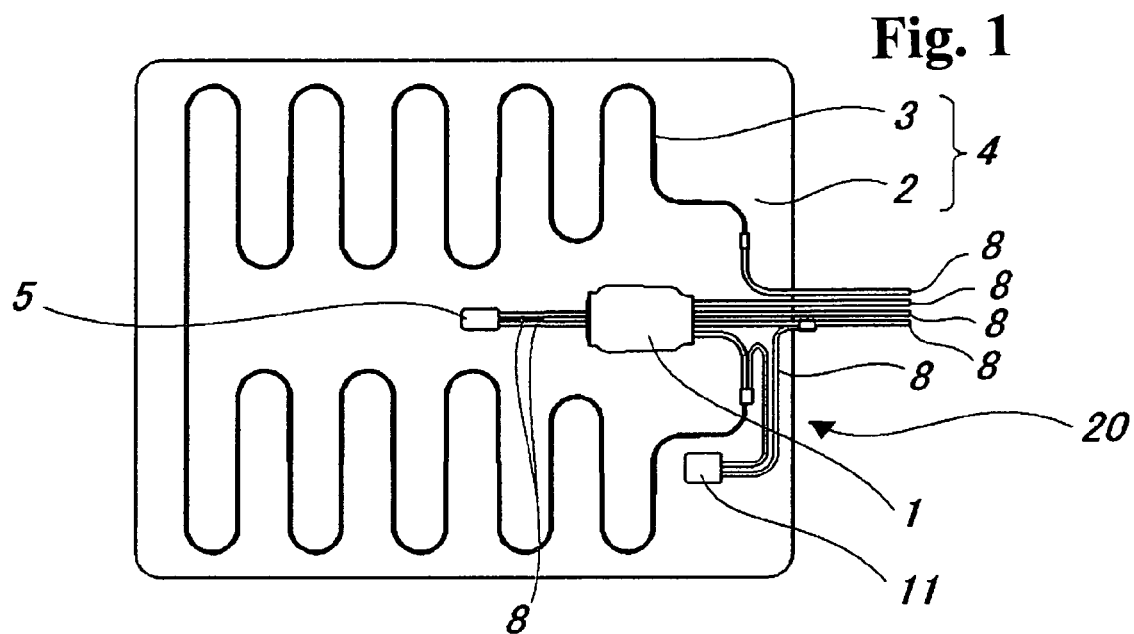
FIG. 1 is a plan view showing an embodiment of a warmer device for a vehicle seat of the present invention.
Figure 2:
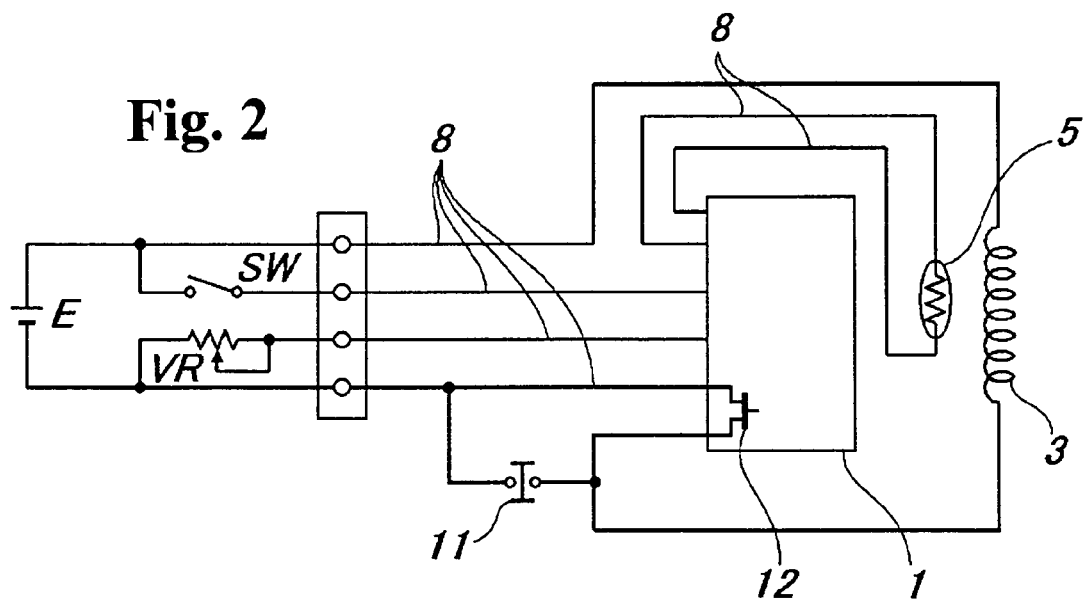
FIG. 2 is a wiring diagram showing the embodiment of the warmer device for the vehicle seat of the present invention.

1 Temperature control circuit
2 Base material
3 Cord-like heater
4 Warming member
5 Temperature detecting element
7 Insulating cover
8 Lead wiring
9 Circuit board
10 Reinforcing board
11 Thermostat
12 Power MOS FET
20 Warmer equipment
E Power supply
SW Switch
VR Volume of temperature setting

DETAILED DESCRIPTION OF PREFERRED EMBODIMENTS

A warmer equipment according to an embodiment of the present invention will be explained with reference to drawings. The embodiment is an example wherein the warmer equipment of the present invention is applied to a warmer device for a vehicle seat.

As shown in FIGS. 1 to 4, as a warming member 4, an object wherein a cord-like heater 3 is fixed on a base material 2, is used. Regarding each structure of the warming member 4, for example, Japanese Patent Publication 3 can be referred.

On the base material 2 of the Japanese Patent Publication 3: Published Unexamined Patent Application No. 2003-174952, a temperature control circuit 1 is arranged in a predetermined position. Lead wirings 8 are connected to the temperature control circuit 1, and other sides of the lead wirings 8 are connected to Power supply E, a volume of temperature setting VR, a switch SW, a temperature detecting element 5 and the cord-like heater 3. Also, the temperature detecting element 5 is arranged in a predetermined position on the base material 2 wherein the temperature of the warming member 4 can be detected as accurately as possible, and the lead wirings 8 of the temperature detecting element 5 are connected to the temperature control circuit 1 on the base material 2. A thermostat 11 arranged in the predetermined position of the base material 2 is connected to a wiring wherein the temperature control circuit 1 and cord-like heater 3 are connected, and a wiring of a minus line of the Power supply, so that the thermostat 11 is connected in parallel with the temperature control circuit 1. With this structure, without increasing the number of the lead wirings 8 ejecting to the outside of the base material 2, the thermostat 11 and a power MOS FET 12 embedded in the temperature control circuit 1 can be connected in parallel.

Figure 3:
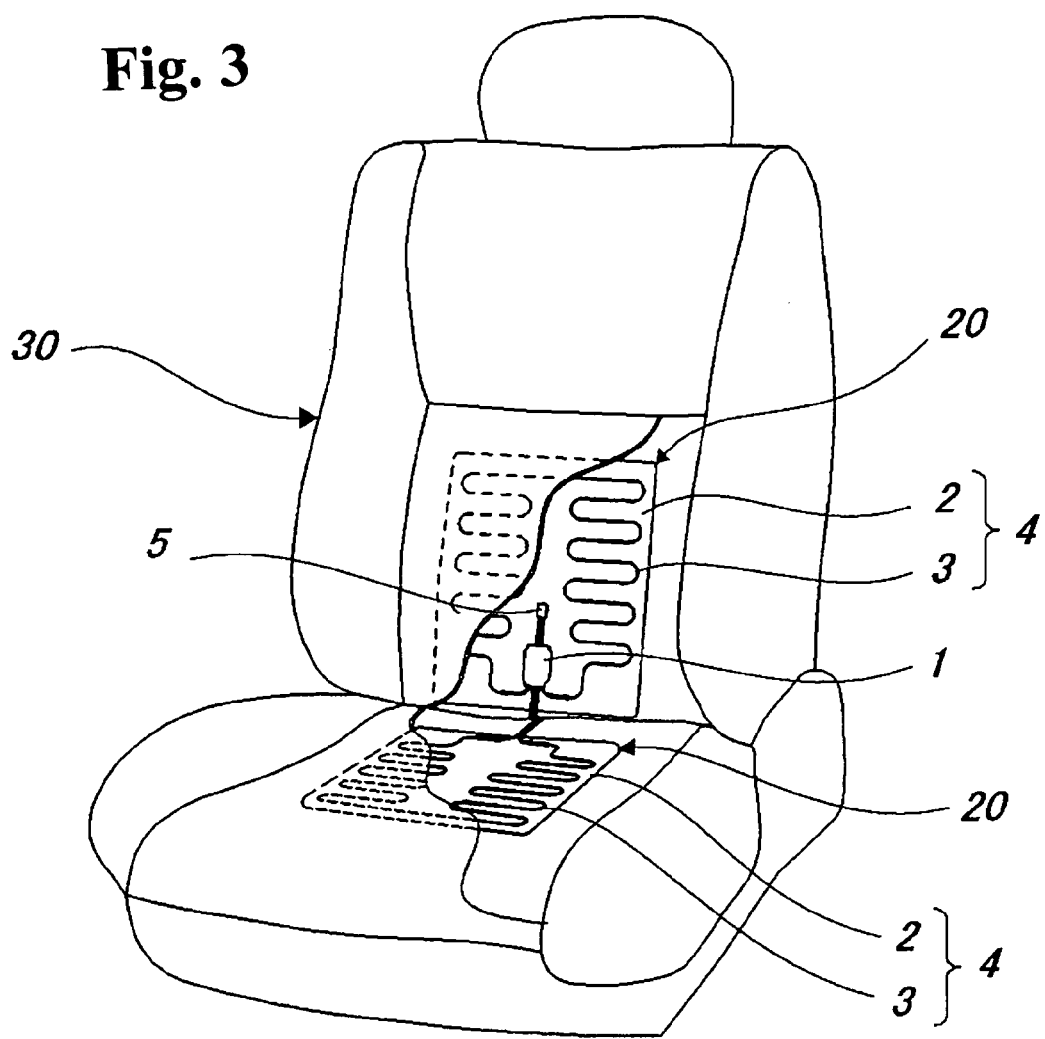
FIG. 3 is a perspective view showing the embodiment of an assembly of the warmer device for the vehicle seat.
Figure 4:
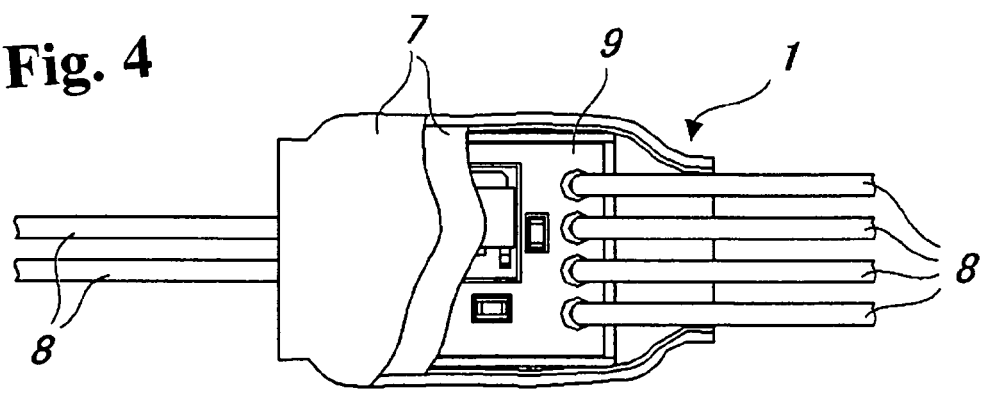
FIG. 4 is a partially cut-out plan view showing the embodiment of a temperature control circuit insulated and covered by a heat shrinkable tube which is a part of the warmer device for the vehicle seat of the present invention.

As shown in FIG. 3, a warmer equipment 20 with the above-mentioned structure is built in a seat 30 as the warmer device for the vehicle seat. An operation mechanism will be explained as follows when the warmer equipment 20 is actually used as the warmer device for the vehicle seat. When Power supply is turned on in a state wherein the temperature of the seat 30 is low, since the electricity contacts of the thermostat 11 are closed, and also the temperature control circuit 1 is in an on-state, the cord-like heater 3 is turned on and the temperature of the cord-like heater 3 increases. As time goes by, when voltage of a temperature signal of the temperature detecting element 5 which is arranged near the cord-like heater 3 increases, and exceeds a reference voltage, the temperature control circuit 1 is turned off. However, since the thermostat 11 has a large heat capacity and the temperature of the thermostat 11 increases slower than that of the temperature detecting element 5, the electricity contacts of the thermostat 11 are closed. At this time, since the thermostat 11 and the temperature control circuit 1 are connected to each other in parallel, the cord-like heater 3 is continuously turned on, and the temperature of the cord-like heater 3 increases further. When the temperature of the thermostat 11 increases up to an OFF temperature, the electricity contacts of the thermostat 11 are opened, and since the temperature control circuit 1 is already off, the electricity of the cord-like heater 3 halts.

The difference between the ON temperature and the OFF temperature of the temperature control circuit 1 can be set to be narrow compared to the thermostat 11, so that if the temperature control circuit 1 is set in such a way that the temperature control circuit 1 is turned on before the temperature of the cord-like heater 3 decreases to the ON temperature of the thermostat 11, even if the electricity contacts of the thermostat 11 are off, the cord-like heater 3 is turned on by the electricity. Additionally, by setting the OFF temperature of the temperature control circuit 1 below the OFF temperature of the thermostat 11, as shown in FIG. 6, the temperature of the cord-like heater 3 at a balancing time after the rising time is dominantly controlled by the temperature control circuit 1.

Thus, in the period from the time when the electricity is turned on until the time when the thermostat 11 is turned off, the electricity on the cord-like heater 3 is never halted due to the temperature control circuit 1. As a result, the rising of the temperature of the warming member 4 can be faster, so that a quick warming-up-ability can be improved. In addition, at the balancing time after the thermostat 11 was turned off, due to the temperature control circuit 1 wherein the difference between the ON temperature and the OFF temperature is small, a stable and comfortable temperature control can be made with a few temperature ripples.

Figure 6:
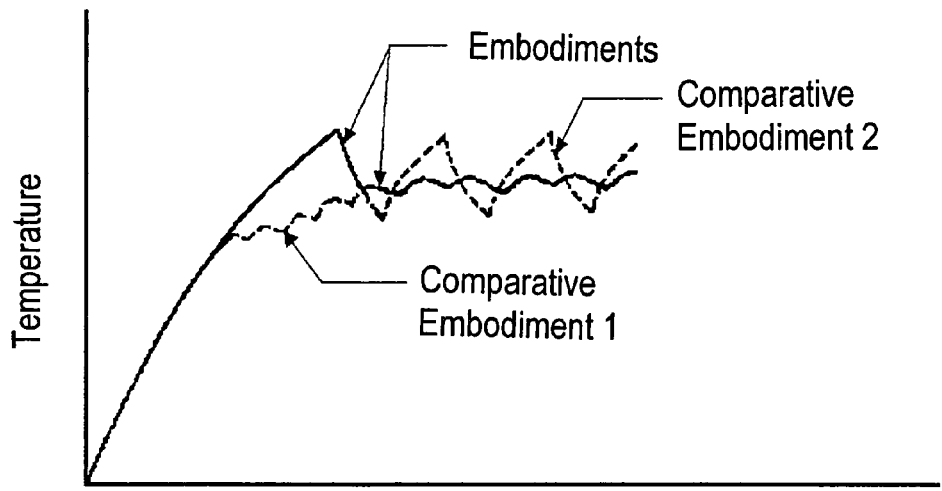
FIG. 6 is a drawing for explaining an operation of the warmer device for the vehicle seat of the embodiment and an operation of the warmer device for the vehicle seat of a comparative embodiment.
Figure 7:
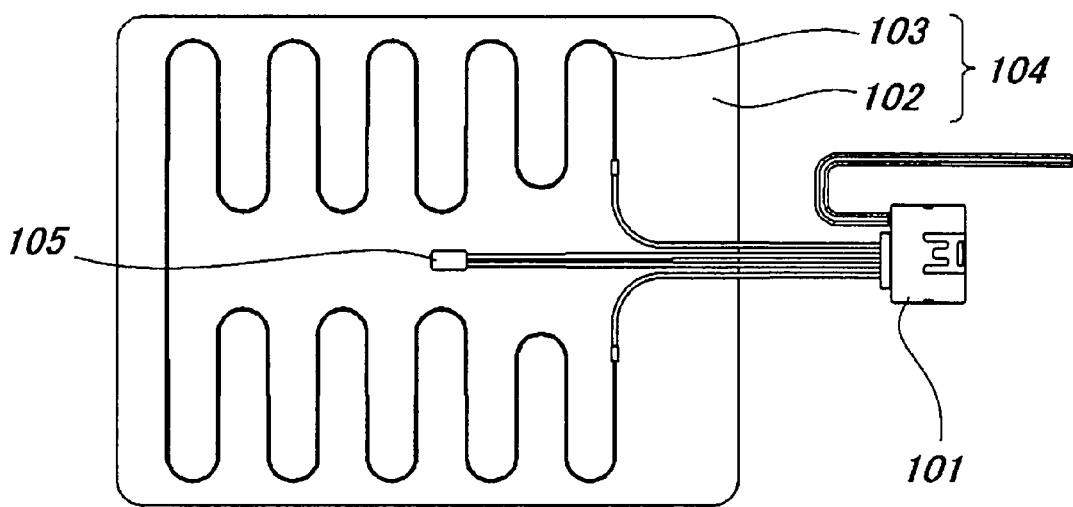
FIG. 7 is a plan view showing the warmer device for the vehicle seat by a conventional technology.
Figure 8:
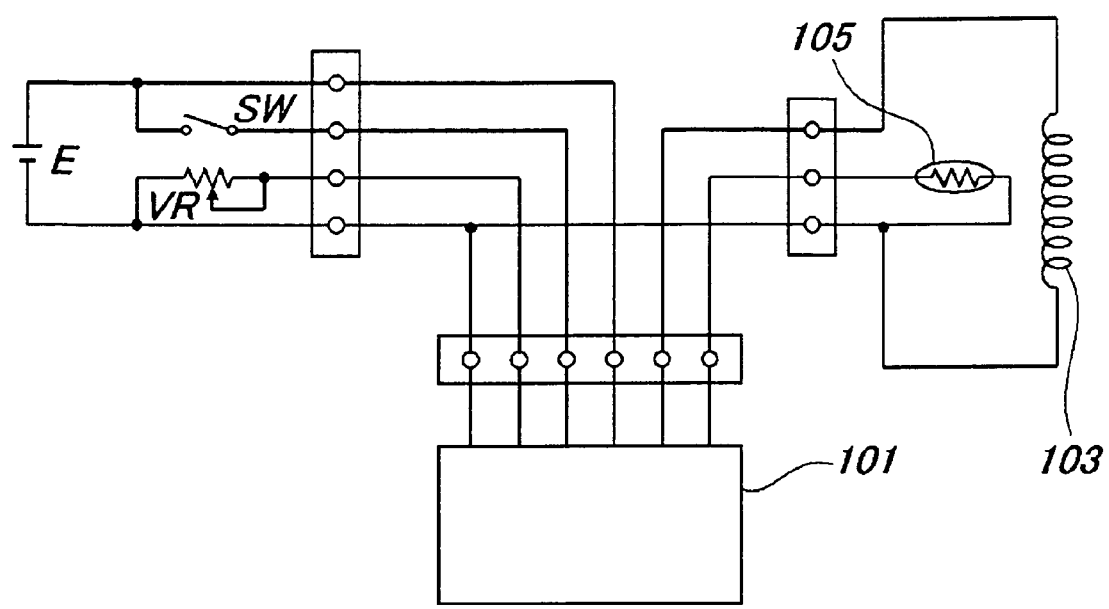
FIG. 8 is a wiring diagram showing the warmer device for the vehicle seat by the conventional technology.

FIG. 6 shows a graph of a change of temperature along time in the warmer equipment according to the embodiment. In addition, it is shown a graph of the change of the temperature according to an example of a temperature control only by the temperature detecting element, as a comparative embodiment 1, and an example of the temperature control only by the thermostat, as a comparative embodiment 2. The embodiment of the present invention has an excellent quick warming-up-ability at a rising time compared to the comparative embodiment 1, and also has fewer ripples of the temperatures at the balancing time and stable temperature compared to the comparative embodiment 2.

Incidentally, as the structure shown in the embodiment, if both the temperature detecting element 5 and the temperature control circuit 1 are preliminarily arranged in the predetermined position of the base material, they can be attached to the seat together, so that they can be easily attached. Also, since the number of the lead wirings 8 which electrically connect between the cord-like heater 3 and the temperature control circuit 1 can be reduced, the cost and weight can be reduced. Moreover, since a connecting distance of the temperature detecting element 5 and the temperature control circuit 1 is shortened, the temperature can be reliably controlled.

The temperature control circuit 1 according to the embodiment is insulated and covered as well as parts of the lead wirings 8 which are connected to the temperature control circuit 1. In the drawings, the reference numeral 7 represents the insulating cover. As an insulating and covering method, a tube formed of an organic material is used as the insulating cover 7, and after a circuit board 9 is arranged inside the tube, a thermoplastic or thermosetting organic material is filled from one end of the tube. Also, a heat shrinkable tube, wherein a thermoplastic adhesive is included in the inner layer as the insulating cover 7, may be used, and the following method may be used. After the circuit board 9 is arranged inside the heat shrinkable tube, the heat shrinkable tube is constricted by heat, so that the surrounding area of the circuit board 9 is filled by the thermoplastic adhesive. The length where the lead wirings 8 are insulated and covered has a predetermined length, so that moisture resistance can be maintained and also durability against a flexure of the lead wirings 8 can be improved.

Consequently, only if the temperature control circuit 1 is insulated and covered as well as portions of the lead wirings 8, the danger of ignition due to dew condensation of the circuit board 9 and the like can be prevented. Also, since inflective load added on the lead wirings 8 due to the insulating cover 7 can be reduced, breakage of the lead wirings 8 can be prevented. Also, since the usage of a large-scale case member and the like is not required, and the size and thickness of the temperature control circuit 1 can be reduced by a large margin, a comfortable seating condition can be obtained without an uncomfortable feeling at the time of seating.

The thickness after the covering of the insulating cover 7 of the temperature control circuit 1 is 9 mm or below, and this is the thickness where a person can sit without an uncomfortable feeling. In addition, the insulating cover 7 are arranged in the predetermined position of the base material 2 so as not to have an uncomfortable feeling at the time of seating. As a result, a very comfortable seating feeling can be obtained.

Incidentally, the insulating and covering method wherein the thickness of the temperature control circuit 1 is 9 mm or below, is not limited to the method using the above-mentioned tube or the heat shrinkable tube. For example, a resin mold method, resin potting method and the like can be used.

Hereinafter, the embodiment of the present invention will be explained further with reference to FIGS. 1 to 5.

In the embodiment, each component part is connected by the lead wirings 8 as described below. A plus side of the Power supply E and the circuit board 9 are connected through the switch SW; the circuit board 9 and one end of the cord-like heater 3 are connected; the plus side of the Power supply E and the other end of the cord-like heater 3 are connected; both the plus side and the minus side of the lead wiring of the temperature detecting element 5 are directly connected to the circuit board 9; the circuit board 9 and the volume of temperature setting VR are connected; and the circuit board 9 is connected to the ground. Also, the thermostat 11 is connected between the lead wiring wherein the circuit board 9 and one end of the cord-like heater 3 are connected, and the lead wiring wherein the circuit board 9 and the ground is connected.

The circuit board 9 is arranged in the heat shrinkage tube that includes the inner layer having a hot-melt adhesive and the outer layer made of electron beam cross-linking olefin resin. And the heat shrinkage tube is heated. As a result, circuit board is covered. At this time, the thickness of the temperature control circuit 1 is set at 9 mm and below. A portion of the lead wirings 8 is insulated and covered with the circuit board 9. The length wherein the lead wirings 8 are covered is suitably approximately 10 mm, so that the insulation can be maintained and also the durability against a flexure can be effective.

The temperature detecting element 5 is fixed in the predetermined position wherein the temperature of a seat heater can be accurately detected, among gaps between the wiring of the cord-like heater 3.

The insulated and covered circuit board 9 is compact (approximately 25 mm×40 mm), thin (9 mm or below), and arranged in the circumferential location of the warming member 4 so as not to cause an uncomfortable feeling at the time of seating.

Incidentally, in the embodiment, as an example of the thermostat 11, the thermostat 11 wherein the OFF temperature is 40° C. and the ON temperature is 30° C., is used. However, the thermostat 11 is not limited to the thermostat 11 described hereinabove, and may be set accordingly by a required temperature or used atmosphere temperature and the like.

Figure 5:
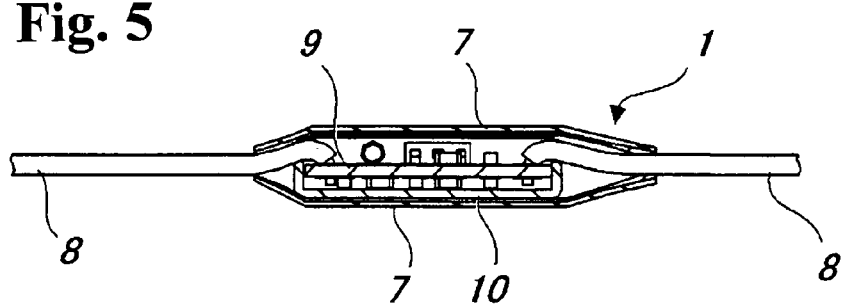
FIG. 5 is a cross sectional view showing another embodiment of the warmer device for the vehicle seat of the present invention.

Incidentally, as shown in FIG. 5, a reinforcing board 10 made of resin and the like is insulated and covered in a state of being overlapped with the circuit board 9, so that breakage of the temperature control circuit 1 due to impact and load at the time of seating can be prevented. In the case of using the above-described reinforcing board 10, the circuit board 9 should be arranged in such a way that the face wherein the reinforcing board 10 is positioned is arranged on the seating face side, so that breakage of the circuit board 9 can be prevented more effectively.

In addition, in order to improve workability at the time of assembling the temperature control circuit 1 to the base material 2, the temperature detecting element 5 can be also embedded inside the insulating cover 7 together with the circuit board 9.

The temperature control circuit 1 is arranged in the base material 2 wherein the cord-like heater 3 is arranged, by a double-faced adhesive tape and the like. However, in order to improve reliability, there may be a method of fixing the temperature control circuit 1 by an appropriate-sized sheet which is the same material as a base material 2 and wherein the double-faced tape is taped.

Also, as the temperature detecting element 5, for example, a thermistor, Platinum Thermo resistance, thermocouple and the like can be used. The above-mentioned materials may be selected accordingly in view of temperature detecting accuracy or cost and the like.

Also, if a material wherein a conductive agent is added is used for the heat shrinkable tube used as the insulating cover 7 in the embodiment, the circuit board 9 can be shielded from Electromagnetic noise caused inside a vehicle, so that effects of noise can be prevented. For the conductive agent, a heretofore known agent such as a carbon black particle, graphite particle, carbon fiber dust, metallic powder, metal-oxide powder, conductive polymer powder and the like can be used.

In the embodiment, the heat shrinkable tube is used for the insulating cover 7; however, the insulating cover 7 may be formed by another embodiment or method. For example, the following methods can be considered. A method wherein after the circuit board 9 is arranged inside a predetermined case, a potting material is filled in the case; a method wherein the circuit board 9 is molded by a hot-melt material; a method wherein a resin molding is performed around the circuit board 9 by an injection molding and the like; a method wherein the circuit board 9 with damp proofing is arranged in the predetermined case; a method wherein the circuit board 9 is dipped in a dissolved resin and coated with the resin; a method wherein the circuit board 9 is arranged inside a pair of cases with interlock and the like, and the cases are filled with an adhesive filling material.

Incidentally, the present invention is not limited to the above-mentioned embodiment. The embodiment has the structure wherein the heater element formed of the cord-like heater is arranged on the base material as the warming member. However, for example, a warmer equipment without the base material can be used. Also, the cord-like heater is used for the heater element. However, for example, other structures, which are heated up by electricity such as a film heater, glass tube heater, ceramic heater and the like, can be used.

Also, a plurality of heater elements can be arranged, or two or more thermostats can be arranged as long as they do not exceed the subject of the present invention. Also, for the purpose of over-temperature protection, a separate thermostat or a PTC (positive temperature coefficient) thermistor element can be arranged.

INDUSTRIAL APPLICABILITY

According to the above-described present invention, the warmer equipment, which has an excellent quick warming-up-ability at a rising time and can subsequently satisfy temperature stability and easily enhance comfortability, can be obtained. The warmer equipment of the present invention can also be applied to, for example, a vehicle seat for a motor cycle or rail car and the like; a child seat; a seat for vessels or aircraft; a seat for a Ferris wheel at an amusement park; a grandstand for various types of stadiums; a seat for a theater or movie theater and the like; a bench installed in a station, theme park, outdoor park and the like; a couch or chair used at home or in an office; a chair at a barber shop; a hospital-use chair used in various types of medical institutions and the like, as well as the warmer equipment for the vehicle seat shown in the above-described embodiment. Also, the warmer equipment can be widely applied not only to the seat, but also to various types of fields such as, for example, a bed; futon; pillow; baby carriage; toilet seat cover; inside of a toilet seat; clothing; cooking equipment and the like.

Also, in the case of applying a heater unit of the present invention to a seat heater for a vehicle, it may be applied to a seat wherein an air-conditioning system is built in. As for the seat wherein the air-conditioning system is built in, for example, a Japanese Patent Publication 4 can be referred.

Japanese Patent Publication 4: International Publication WO2005/084493

In addition, the heater unit can be used in the form of being arranged on the surface of the seat later as well as the form of being built inside the seat.

What is claimed is:

1. A warmer equipment, comprising:
a warming member including a heater element;
a temperature controlling thermostat directly connected to the heater element;
a temperature detecting element for detecting temperature of the warming member; and
a temperature control circuit for controlling the temperature of the warming member, the temperature control circuit directly connected to the heater element and turning on or off the heater element by output from the temperature detecting element,
wherein the temperature control thermostat and the temperature control circuit are connected in parallel to the heater element so that the heater element is turned on when at least one of the temperature controlling thermostat and the temperature control circuit is turned on.

2. A warmer equipment according to claim 1, wherein an on-off operation range of the temperature detecting element is set in an on-off operation range of the temperature control thermostat.

3. A warmer equipment according to claim 1, wherein the warming member comprises a base material and a heater element including a cord heater arranged in the base material, and wherein the temperature controlling thermostat, the temperature detecting element and the temperature control circuit are all arranged in a predetermined position of the base material.

4. A warmer equipment according to claim 3, wherein the temperature control circuit is insulated and covered together with a portion of a lead wire connected to the temperature control circuit.

5. A warmer equipment according to claim 3, wherein a lead wire of the temperature detecting element is connected to the temperature control circuit on the base material.

6. A warmer equipment according to claim 4, wherein the temperature control circuit has a thickness of 9 mm or below.

7. A warmer device for a vehicle seat, comprising the warmer equipment according to claim 1.

8. A warmer equipment according to claim 1, wherein the thermostat has a heat capacity so that increase of temperature is slower than that of the temperature detecting element.

9. A warmer equipment according to claim 8, wherein a temperature difference between on and off of the temperature control circuit is set smaller than that of the thermostat so that the temperature control circuit is turned on before the thermostat is lowered to turn on, and an off temperature of the temperature control circuit is set below an off temperature of the thermostat.

* * * * *